United States Patent [19]
Jutamulia et al.

[11] Patent Number: 5,337,106
[45] Date of Patent: Aug. 9, 1994

[54] LIQUID-CRYSTAL IMAGE DIRECTOR FOR SINGLE-LENS-REFLEX CAMERA

[75] Inventors: Suganda Jutamulia, Fremont; Hideaki Niwa; Shinji Toyoda, both of Cupertino, all of Calif.

[73] Assignee: Kowa Company, Ltd., Tokyo, Japan

[21] Appl. No.: 74,227

[22] Filed: Jun. 9, 1993

[51] Int. Cl.$^5$ .............................................. G03B 19/12
[52] U.S. Cl. ...................................... 354/152; 351/215
[58] Field of Search ........................... 354/62, 152–158, 354/219; 359/38, 39, 40, 41; 351/205, 206, 213, 215

[56] References Cited

U.S. PATENT DOCUMENTS

| | | | |
|---|---|---|---|
| 589,349 | 8/1897 | Holst | 354/156 |
| 4,756,613 | 7/1988 | Okashita | 351/206 |
| 4,786,928 | 11/1988 | Lawther et al. | 354/153 |
| 4,836,657 | 6/1989 | Gunji et al. | 359/38 |
| 4,917,452 | 4/1990 | Liebowitz | 359/39 |
| 5,015,086 | 5/1991 | Okaue et al. | 351/44 |
| 5,029,989 | 7/1991 | Phillips | 359/276 |
| 5,111,315 | 5/1992 | Ledebuhr | 359/40 |
| 5,177,511 | 1/1993 | Feurstein et al. | 351/205 |

FOREIGN PATENT DOCUMENTS

| | | |
|---|---|---|
| 61-255320 | 11/1986 | Japan . |
| 63-194229 | 8/1988 | Japan . |
| 1144018 | 6/1989 | Japan . |
| 1183624 | 7/1989 | Japan . |
| 2105122 | 4/1990 | Japan . |

OTHER PUBLICATIONS

F. T. S. Yu and S. Jutamulia, "Optical Signal Processing, Computing, and Neural Networks," Wiley, N.Y., 1992, pp. 168-175, 198-199.
B. E. A. Saleh and M. C. Teich, "Fundamentals of Photonics," Wiley, N.Y., 1991, pp. 721-728.
S. C. Gratze, "Switching, Optical," in Encyclopedia of Lasers and Optical Technology, Ed. R. B. Meyers, Academic, San Diego, 1991, pp. 633-643.
Newport 1993 Catalog, pp. A2-A3.

*Primary Examiner*—Howard B. Blankenship

[57] ABSTRACT

The mirror in a single-lens-reflex (SLR) camera is eliminated by employing a liquid crystal cell and a polarizing beam splitter. The light from an illuminating lamp (32) is linearly polarized in a horizontal direction by a polarizer (58). The polarized illuminating light is totally reflected by a polarizing beam splitter (PBS) (54) and passes through a quarterwave plate (QWP) (56) and an objective lens (36). After passing through QWP (56) for the second time, the light is vertically polarized and totally passes through PBS (54). A focusing lens (40) focuses the image onto a film (30). A voltage supply (46) is connected to a liquid-crystal (LC) cell (44) by an electric switch (52) that can turn LC cell (44) on or off. When LC cell (44) is off, the polarization of the light is rotated by 90° to be horizontally polarized. Thus the light is reflected by another PBS (48) to a prism (24) for viewing by a user (26). When the LC cell (44) is on, the light polarization is not rotated, and the light is transmitted through the PBS (48) to a mechanical shutter (28). During the shutter's (28) open period, an intense light pulse from a strobe lamp (42) illuminates a patient's eye (38) and exposes film (30). Shutter (28) can be eliminated since the LC cell (44) and the PBS (48) may also function as shutter.

11 Claims, 5 Drawing Sheets

LIQUID-CRYSTAL IMAGE DIRECTOR FOR SINGLE-LENS-REFLEX CAMERA

BACKGROUND OF THE INVENTION

1. Field of Invention

This invention relates to single-lens-reflex (SLR) cameras, specifically to an improved light reflection mechanism for an SLR camera using a liquid-crystal switch.

2. Description of Prior Art

The single-lens-reflex (SLR) camera is the most highly developed and popular camera. The basic idea is to use a hinged mirror to reflect the image formed by the lens onto a viewing screen until exposure. This enables a photographer to see the image exactly as it will be formed on film. When the photographer actuates the shutter, the mirror pivots up and away so that the light of the object photographed can image directly onto the back of the camera in synchronism with the opening of the shutter. After exposure the mirror pivots back. The main advantage of SLR structure is that in addition to enabling the photographer to see exactly what the film will see, the SLR will also enable the photographer to also see precise distance focused, the depth of field, and the field of view on the viewing screen.

A prior-art SLR mechanism is schematically shown in FIGS. 1 and 2. FIG. 1 shows the light path when a shutter 28 is closed. The incident light passes through a lens 20 and is reflected by a hinged mirror 22 to a prism 24. Thus the image formed by lens 20 can be viewed by a user 26 through prism 24 and related viewing optics.

FIG. 2 shows the light path when an exposure is taken. When the shutter release button of the camera is pressed, hinged mirror 22 pivots up, allowing light to reach the back of the camera. Then mechanical shutter 28 is opened for a desired, preset exposure time. Consequently, the image formed by lens 20 exposes film 30. After exposure, shutter 28 closes again, and hinged mirror 22 falls back into place (FIG. 1).

It is obvious that the SLR structure allows no light to be wasted in film exposure, since 100% of the incident light goes to film 30.

The SLR structure is especially useful for ophthalmic cameras, especially a fundus camera, which is designed to photograph the fundus (macular region or fovea) of the retina. This is because the intensity of the light reflected from the photographed eye region is very low. For example, only about two percent of incident light is reflected by retina. Also, the intensity of illuminating light must be relatively low in order not to damage the eye.

A schematic diagram of a prior-art fundus camera is shown in FIG. 3. A pilot lamp 32 illuminates a patient's eye 38 through a half-silvered mirror 34 and an objective lens 36. The light reflected from eye 38 passes again through objective lens 36. After passing through mirror 34, the collected light is focused by a focusing lens 40 onto viewer's eye 26 via hinged mirror 22 and prism 24. Before shutter 28 opens, mirror 22 flips up so that the light travels to shutter 28 so that when shutter 28 opens, lens 40 focusses the light onto film 30. Thus a user 26 can monitor the image of fundus before a picture is taken.

When the picture is taken, a strobe lamp 42 is pulsed on, causing an intense and short pulse of light (about 350 microseconds) illuminates patient's eye 38 and exposes film 30.

The mechanism of the SLR camera and its advantages have been known for long time. A large number of attempts for improving the mechanism of hinged mirror and mechanical shutter have been made. For example, U.S. Pat. No. 589,349 to Holst (1897) and U.S. Pat. No. 4,786,928 to Lawther et al. (1988) describe two of those attempts. Holst uses a mirror composed of two movable abutting parts to enable an SLR camera to take photographs with lenses having different focal lengths. Lawther uses a single downward-swinging mirror to reduce the required clearance behind the lens for the mirror movement. Since they still use moving mirrors, the mechanical motion of the mirror in their SLR cameras, as well as the mechanical motion of the mirror in other SLR cameras, generates uncomfortable sound and vibration that may degrade the quality of the picture taken.

Similarly, many improvements have been made on fundus cameras. However, those apply only to fundus cameras that employ the hinged mirror. For example, U.S. Pat. No. 4,756,613 to Okashita (1988) describes a fundus camera employing a pair of automated viewing targets. When a picture is taken, the motion of the hinged mirror generates vibration and sound that may blur the image of the fundus.

To summarize, the disadvantages of this prior-art SLR type fundus camera are as follows:

(a) The motion of hinged mirror 22 generates vibration. This requires that the strobe light exposure must wait until the vibration is negligible.

(b) The motion of hinged mirror 22 generates sound that may stimulate the motion of the patient's eye under exposure.

(c) The sound generated by hinged mirror 22 is uncomfortable for both the operator, a physician or a technician, and the patient.

(d) Hinged mirror 22 is fragile. Thus a fundus camera employing a hinged mirror does not last long.

OBJECTS AND ADVANTAGES

Accordingly, several objects and advantages of the present invention are:

(a) to provide a liquid-crystal image director which does not generate vibration; thus the strobe light exposure need not be delayed;

(b) to provide a liquid-crystal image director which does not emit sound that could stimulate the patient's eye;

(c) to provide quiet operation that is comfortable for both operator and patient;

(d) to provide a compact and durable system with no hinged mirror or other bulky mechanical part.

Further objects and advantages are to provide a SLR camera which is simple to use and maintain and which is inexpensive to manufacture in volume. Still further objects and advantages will become apparent from a consideration of the ensuing description and drawings.

DRAWING FIGURES

In the drawings, closely related figures have the same number but different alphabetic suffixes.

REFERENCE NUMERALS IN DRAWINGS

| | |
|---|---|
| 20 camera lens | 22 hinged mirror |
| 24 prism | 26 user |
| 28 mechanical shutter | 30 film |
| 32 lamp | 34 half-silvered mirror |
| 36 objective lens | 38 patient's eye |
| 40 focusing lens | 42 strobe lamp |
| 44 liquid crystal (LC) cell | 46 electrical source |
| 48 polarizing beam splitter (PBS) | 50 polarizer |
| 52 electric switch | 54 PBS |
| 56 quarter-wave plate (QWP) | 58 polarizer |

SUMMARY

In accordance with the invention, an electronically controlled liquid-crystal (LC) image director replaces a mechanical hinged-mirror in a fundus camera. Furthermore, a combination of a polarizing beam splitter (PBS) and a quarterwave plate (QWP) directs polarized light to and from the fundus.

Figure 4A:
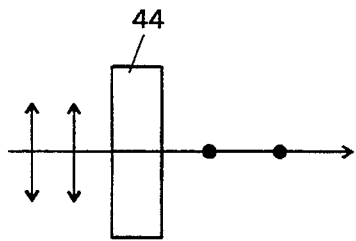
FIGS. 4A and 4B show a liquid crystal (LC) cell that electronically controls polarization of light, in accordance with the invention.
Figure 4B:
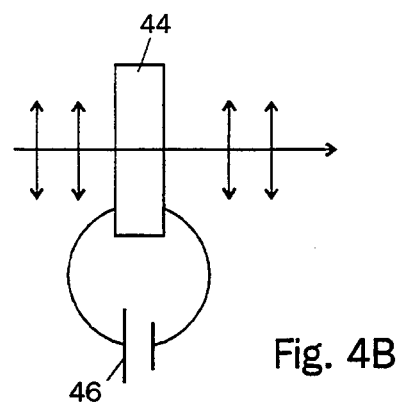

FIGS. 4A and 4B—Description

FIGS. 4A and 4B show the function of an LC cell 44 used in a camera of the invention. The mechanism by which LC cell modulates the polarization of light is widely known. The detailed explanation is given in literature, for example, "Optical Signal Processing, Computing, and Neural Networks," (Wiley, 1992) by F. T. S. Yu and S. Jutamulia, pp 169–174. Also it is described in "Fundamentals of Photonics," (Wiley, 1991) by B. E. A. Saleh and M. C. Teich, pp 721–728.

Basically LC cell 44 consists of two glass substrates covered with transparent electrodes of indium-tin-oxide (ITO). A layer of twisted nematic LC molecules fill the space between two glass substrates. In nematic LCs, the molecules tend to be parallel but their positions are random.

When no electric voltage applied across the layer of LC molecules (FIG. 4A) the LC cell is OFF and the layer of LC molecules contains repeated and continuous 90° twists. Arrows and dots in the figures represent the direction of light polarization. The arrows indicate polarized light which is parallel with the drawing paper; this is called vertical polarization. The dots indicate polarized light which is perpendicular to the paper; this is called horizontal polarization. If the incident light is linearly polarized, it will be rotated by 90° by the layer of twisted LC molecules, i.e., vertical polarization becomes horizontal polarization (FIG. 4A).

When an electric field generated by an electrical source 46 is applied, the LC cell is ON. As a result, the twist and the tilt of the molecules in the LC layer are altered, and the LC molecules all attempt to align parallel with the applied field. FIG. 4B shows that when all the LC molecules align in the direction of the applied field, the molecules do not affect the polarization of the incident light, i.e., the polarization of the incident light is not rotated (FIG. 4B).

Based on this phenomenon, various LC shutters and LC displays have been designed and applied. By placing an analyzer, which is a polarizer having a polarization direction parallel with the polarization of the incident light, behind LC cell 44, the light can be blocked or transmitted, depending on whether the electric field is applied (LC cell is ON) or not applied (LC cell is OFF). Electronic sunglasses using a pair of LC cells and two pairs of polarizers are described in U.S. Pat. No. 5,015,086 to Okaue et al. (1991). LC shutters for a camera based on an LC cell and a pair of polarizers are also reported in Japanese patent publications (Kou-Kai), Sho 61-255320 (1986), Sho 63-194229 (1988), Hei 1-144018 (1989), Hei 1-183624 (1989), and Hei 2-105122 (1990). The use of variable sectional LC shutters to perform optical processing is mentioned in U.S. Pat. No. 5,177,511 to Feuerstein et al. (1993).

In addition to LC cells, there are other electro-optic devices that can rotate the polarization of incident light. For example, a lead-lanthanum-zirconate-titanate device commonly called PLZT (Pb-La-Zirconate-Titanate) can be used for this purpose. A camera shutter employing a PLZT cell and a pair of polarizers is described in U.S. Pat. No. 5,029,989 to Phillips (1991).

Another physical phenomenon used for LC switching is the total reflection generated by an LC interface layer between two substrates, as described in "Switching, Optical," by S. C. Gratze in "Encyclopedia of Lasers and Optical Technology," (Academic, 1991) edited by R. A. Meyers, pp 636–637. The LC layer will result in total reflection or transmission, depending upon the electronic signal that changes the refractive index of the LC layer. Based upon this concept, Gunji et al. and Liebowitz invented LC switches for optical fibers, as described in U.S. Pat. Nos. 4,836,657 (1989) and 4,917,452 (1990), respectively.

Figure 5A:
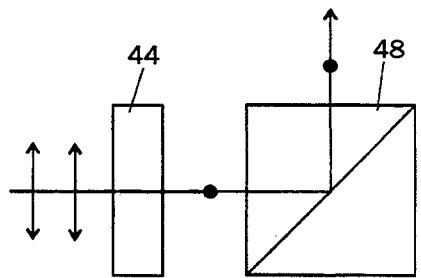
FIGS. 5A and 5B show the principle of an image director using a LC cell and a polarizing beam splitter (PBS), in accordance with the invention.
Figure 5B:
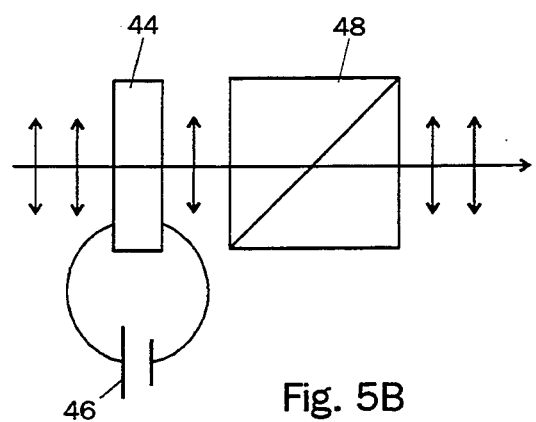

FIGS. 5A and 5B—Description

In contrast to the aforementioned devices (Okaue et al., Feuerstein et al., Phillips and Japanese patent publications), the present device does not employ the second polarizer (analyzer). The LC cell is not used to block the light, but rather is used to direct the light. In accordance with the invention (FIGS. 5A and 5B), a polarizing beam splitter (PBS) 48 is placed immediately after LC cell 44. A PBS is an optical device that reflects incident light with horizontal polarization (indicated by dots) which is parallel with the PBS's diagonal plane (FIG. 5A), and transmits incident light with vertical polarization (indicated by arrows) which is, of course, perpendicular to horizontal polarization (FIG. 5B).

Figure 1:
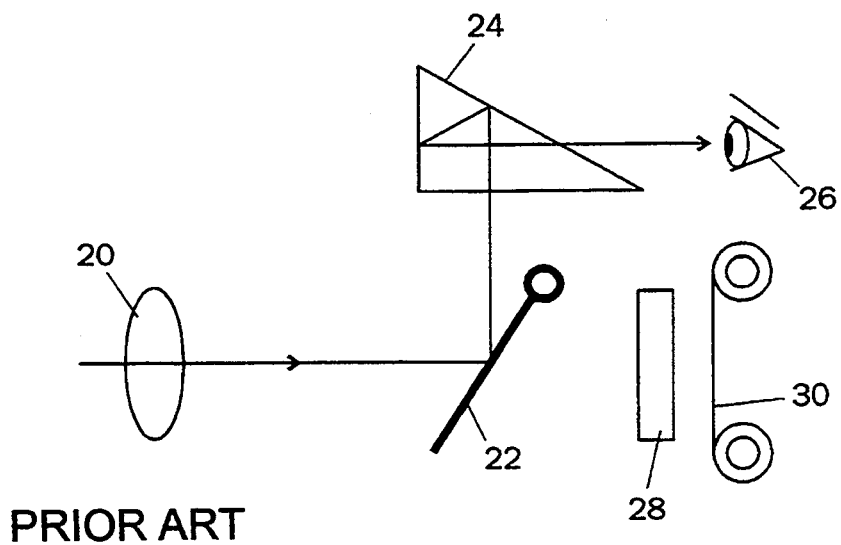
FIGS. 1 and 2 show a prior-art SLR camera with the shutter off and on, respectively.

In FIG. 5A, LC cell 44 is OFF, causing the light's polarization to be rotated by 90°. Thus it will be reflected by PBS 48. This is similar to the situation when hinged mirror 22 is back in the position in FIG. 1.

Figure 2:
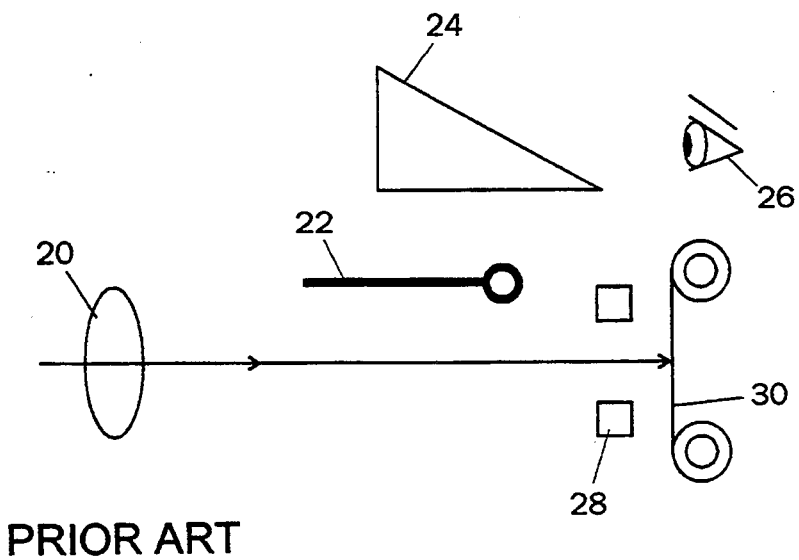
Figure 3:
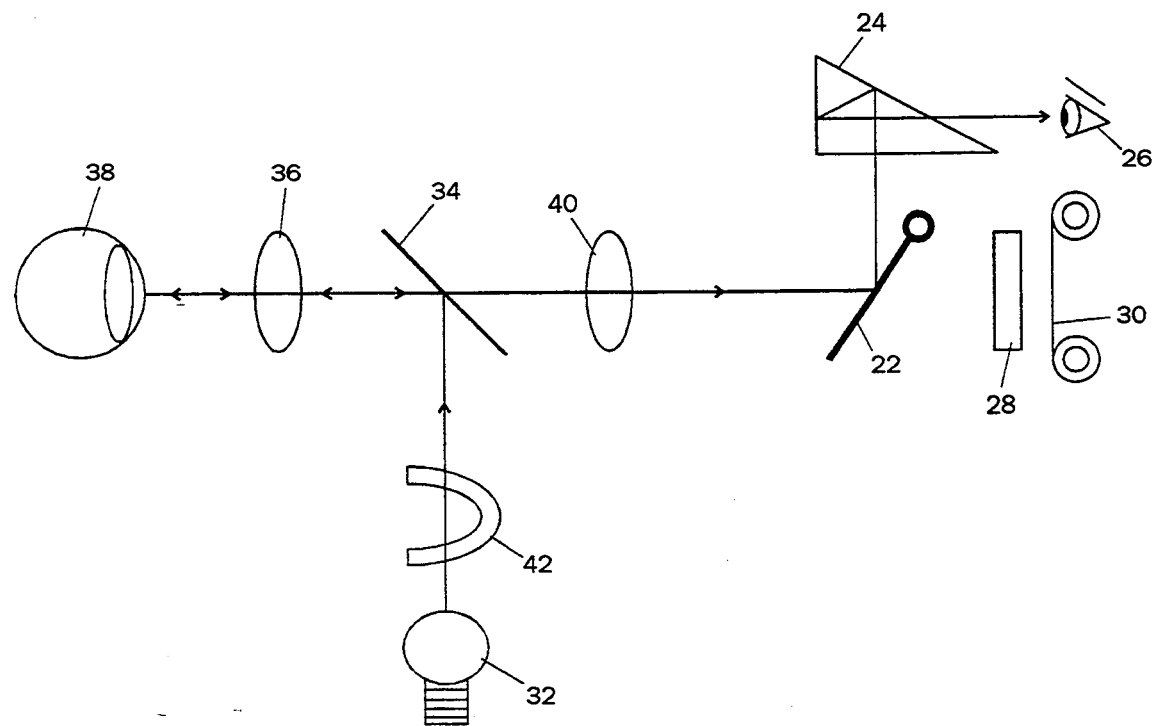
FIG. 3 shows a schematic diagram of a prior-art fundus camera.

In FIG. 5B, LC cell 44 is ON, as a result of which the light's polarization is not rotated. Consequently, it will be transmitted through PBS 48. This is similar to the situation when hinged mirror 22 flips up in FIG. 2.

The basic understanding of beam deflection by an LC cell and a PBS is widely known, as is beam attenuation by an LC cell and a pair of polarizers. Generic discrete components for these purposes are available from Newport Corporation, Irvine, California (Newport 1993 Catalog, pp A2-A3).

In contrast to many devices based on beam attenuation (Okaue et al., Feuerstein et al., Phillips, and Japanese patent publications mentioned previously), only few beam deflection structures are incorporated in an optical system. A combination of LC cells, color sensitive PBSs and a color insensitive PBS for selectively switching color beams for illuminating a light valve for projection display is described in U.S. Pat. No. 5,111,315 to Ledebuhr (1992). However, Ledebuhr made no attempt to replace the hinged mirror with a combination of an LC cell and a PBS in an SLR camera.

FIG. 6—Description

Figure 6:
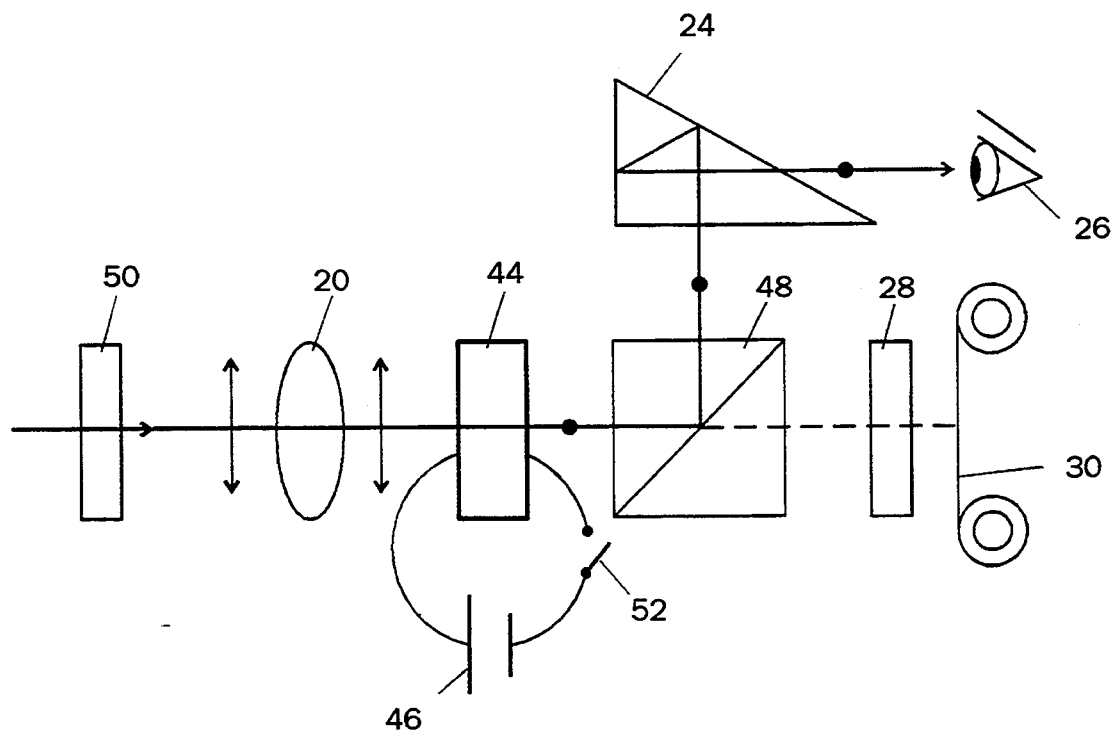
FIG. 6 shows a schematic diagram of an SLR camera according to the invention.

FIG. 6 shows a schematic diagram of the present device. Incident light is linearly polarized in vertical direction by a polarizer 50. Although polarizer 50 is shown in FIG. 6 in front of camera lens 20, it can alternatively be placed between lens 20 and LC cell 44. The image formed by camera lens 20 can be directed either to prism 24 for viewing, or to film 30 for exposure, without any mechanical motion of any hinged mirror.

Electrical source 46 is connected to LC cell 44 by a switch 52 that can turn LC cell 44 ON or OFF. When LC cell 44 is OFF, the polarization of the incident light is rotated by 90° by LC cell 44 to be horizontally polarized. Thus the incident light is reflected by PBS 48 to prism 24. When LC cell 44 is ON, LC cell 44 does not rotate the light's polarization. Consequently, the incident light is transmitted through PBS 48 to shutter 28. Film 30 is exposed to the incident light when shutter 28 opens.

On the other hand, U.S. Pat. No. 5,029,989 to Phillips (1991) and Japanese patent publication Hei 1-183624 (1989) disclose PLZT and LC shutters that require a beam splitter to split the incident light to a viewing window and a shutter at all times. Thus these approaches lose 50% of the incident light intensity for film exposure. In contrast, in the present device, the polarized incident light is not splitted by a beam slitter, but is directed exclusively by the combination of LC cell 44 and PBS 48, either to prism 24 for viewing or to film 30 for exposure. Thus no exposure light intensity is lost if the incident light is linearly polarized.

Figure 7:
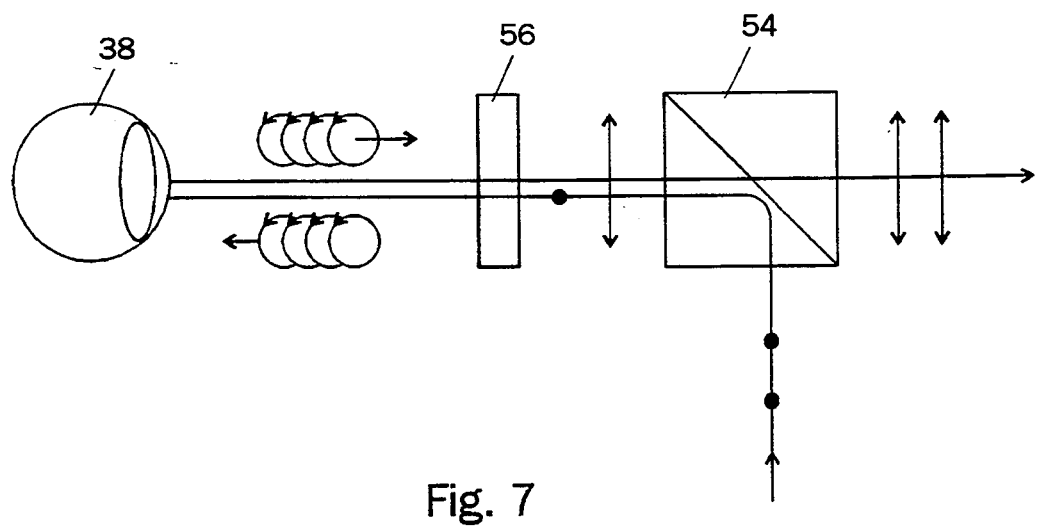
FIG. 7 shows light illumination for fundus using a PBS and a quarter-wave plate (QWP), in accordance with the invention.

-FIG. 7—Description

It is seen that the incident light must be linearly polarized. If the incident light is randomly polarized, at least 50% of the light intensity is lost when it passes through a polarizer to make it linearly polarized. However, for a fundus camera, since the illumination is not the natural light, polarized light sources may be used instead of unpolarized light sources. This will further increase the light efficiency, as will be shown in the following paragraph.

FIG. 7 shows the illumination arrangement for a fundus camera using linearly polarized light. Since the incident light is horizontally polarized, it is totally reflected by a PBS 54 to a quarter-wave plate (QWP) 56. A QwP is an optical device that converts linearly polarized light to circularly polarized light and vice-versa. Thus, after passing through QWP 56, the light is circularly polarized and it illuminates the fundus of patient's eye 38. The circular polarization is reversed after reflection. After passage through the same QWP 56, it becomes vertically polarized. The reflected light totally passes through PBS 54. This arrangement has been used for various applications, including the optical head of an optical disk system, as also discussed in "Optical Signal Processing, Computing, and Neural Networks," (Wiley, 1992) by F. T. S. Yu and S. Jutamulia, p 198.

FIG. 8—Description

Figure 8:
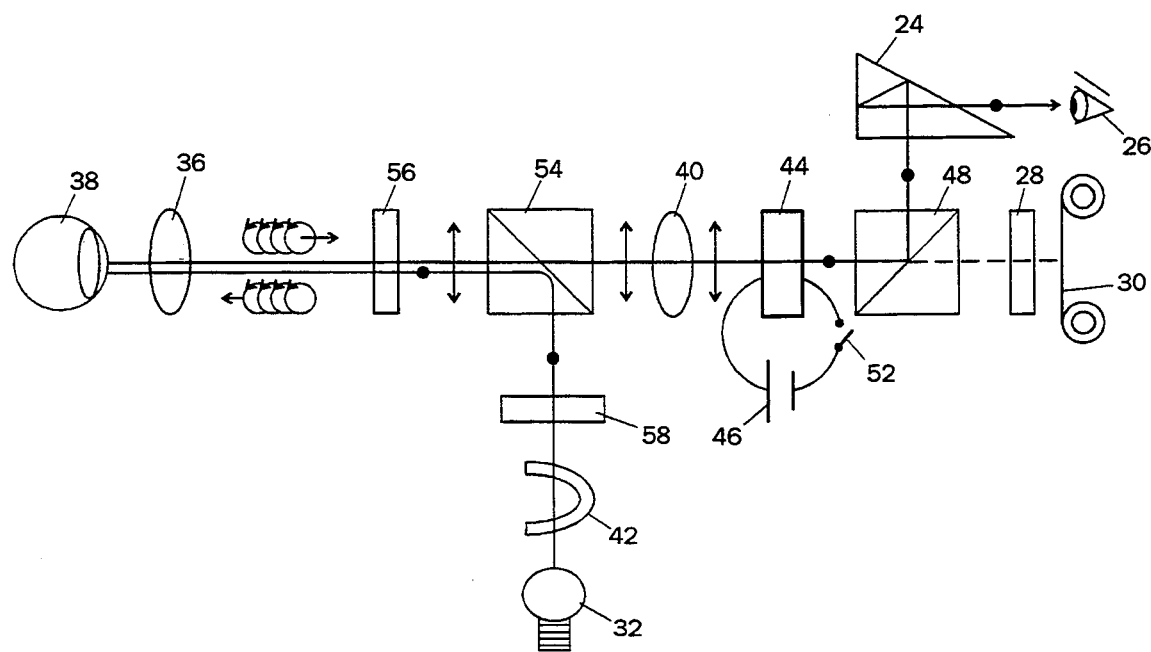
FIG. 8 shows a schematic diagram of a fundus camera according to the invention.

FIG. 8 shows a schematic diagram of the present device used in a fundus camera. The light from an illuminating lamp 32 is linearly polarized in horizontal direction by a polarizer 58. The polarized illuminating light is totally reflected by a PBS 54 to a QWP 56. The light becomes circularly polarized after passing through QWP 56. The illuminating light passes an objective lens 36 and illuminates retina or fundus of a patient's eye 38.

The light is reflected from the retina with having reversed circular polarization. It then passes objective lens 36 and QWP 56. After passing through QWP 56, the light is vertically polarized and totally passes through PBS 54. A focusing lens 40 focuses the image onto film 30.

Electrical source 46 is connected to LC cell 44 by switch 52 that can turn LC cell 44 ON or OFF. When LC cell 44 is OFF, the polarization of the light is rotated by 90° to be horizontally polarized. Thus the light is completely reflected by another PBS 48 to a prism 24 for viewing by a user 26. When LC cell 44 is ON, the light polarization is not rotated, and the light is transmitted completely through PBS 48 to a mechanical shutter 28. During the open period of shutter 28, the light exposes film 30.

When the shutter release button of the camera is pressed, LC cell 44 is turned ON. Consequently, the polarization of light reflected from fundus and passing through PBS 54 is not rotated by LC cell 44. The light passing through LC cell 44 is transmitted completely through PBS 48 to reach the back of the camera. Then mechanical shutter 28 is opened, and strobe lamp 42 flashes for about 350 microseconds. Consequently, the image formed by objective lens 20 and focusing lens 40 exposes film 30. After strobe light flashes, mechanical shutter 28 immediately closes again, and LC cell 44 is turned OFF again. The light goes back to prism 24 and the image formed is ready for viewing.

Shutter Elimination

The apparatus can be further improved by the elimination of mechanical shutter 28. By using a high quality LC cell 44 which rotates light polarization by 90° when no electric field is applied, and a high contrast PBS 48, for example, a largeacceptance-angle Glan-Thompson polarizer with a typical contrast ratio of 100,000:1, mechanical shutter 28 is no longer required.

Film Protective Shutter

If the film-containing part of the camera is detachable from the main body, another alternative is to replace mechanical shutter 28 with a film-protective shutter, which always opens when the film containing part is attached to the main body. The film protective shutter is closed when the film-containing part is detached from the main body.

SUMMARY, RAMIFICATIONS, AND SCOPE

Accordingly, the reader will see that we have provided a mirrorless SLR camera which can be used in a fundus camera and in other applications. Instead of a hinged mirror, an LC cell that can rotate polarization direction by 90° or 0° depending on the applied electronic signal, and a PBS are combined to function as an image director in an SLR camera. Furthermore, linearly polarized light is used to illuminate the object, i.e., the patient's eye. A combination of a PBS and a QWP allows the illuminating light to be totally reflected towards the object and also allows the reflected light totally transmitted through the PBS towards a viewing screen or film.

It is apparent that the image can be redirected from the viewing screen to the film when the shutter is open without any mechanical motion. Therefore no vibration is generated. The exposure can be immediately taken without waiting until the vibration comes to rest. Also, there is no sound generated by the hinged mirror. Therefore the patient's eye will not be stimulated to move from a fixed position.

In a further improvement, the mechanical shutter is no longer required. The combination of the LC cell and the PBS can also function as a shutter, in addition to their role as an image director. This is especially useful in a fundus camera and the like, since the exposure time is not determined by the shutter, but by the pulse duration of the illuminating strobe light.

Although the description above contains many specificities, these should not be construed as limiting the scope of the invention but as merely providing illustrations of some of the presently preferred embodiments and applications of this invention. For example, condenser, imaging, focusing and other lenses can be placed somewhere along the light path in the camera; also filters and other optical elements can be added; other electro-optic devices, such as ferroelectric LCs, PLZTs, Pockel cells, magneto-optic spatial light modulators, etc, which can rotate polarization direction, can replace the LC cell. In addition to a fundus camera, the device can also be used in various other cameras, such as an ordinary camera and other types of ophthalmic equipment, endoscopes, borescopes, microscopes, telescopes, spotting scopes, etc.

Thus the scope of the invention should be determined by the appended claims and their legal equivalents, rather than by the examples given.

We claim:

1. A light-directing mechanism for replacing a hinged mirror in a single-lens-reflex camera, comprising:
   polarizing means for polarizing incident light to provide a beam of polarized incident light,
   polarization-rotating means for rotating the polarization of said beam of polarized light to provide an output beam from said polarization-rotating means,
   activating means for activating said polarization-rotating means so that said output beam from said polarization-rotating means is not rotated,
   a polarizing beam splitter for receiving said output beam from said polarization-rotating means and causing said output beam from said polarization-rotating means to traveling in a first direction when said output beam from said polarization-rotating means is rotated and in a second direction when said output beam from said polarization-rotating means is not rotated,
   first utilization means for utilizing light traveling in said first direction from said polarizing beam splitter, and
   second utilization means for utilizing light traveling in said second direction from said polarizing beam splitter.

2. The mechanism of claim 1 wherein said first utilization means is a viewer and said second utilization means is a portion of film in said camera.

3. The mechanism of claim 1 wherein said polarization-rotating means is a liquid-crystal cell comprising a pair of transparent electrodes and liquid-crystal materials.

4. The mechanism of claim 1 wherein:
   said first utilization means is a viewer and said second utilization means is a portion of film in said camera, and
   said polarization-rotating means is a liquid-crystal cell comprising a pair of transparent electrodes and liquid-crystal materials.

5. A light-directing mechanism for replacing a hinged mirror in a single-lens-reflex camera, comprising:
   polarizing means for polarizing incident light to provide a first beam of polarized light,
   a first polarizing beam splitter for reflecting said first beam of polarized light to provide a reflected beam of polarized light,
   a quarter-wave plate for causing said reflected beam of polarized light to be circularly polarized to provide a beam of circularly polarized light,
   imaging means for imaging said beam of circularly polarized light onto an object so that said beam of circularly polarized light is reflected from said object to provide a reflected beam of reverse circularly polarized light so that said reflected beam of reverse circularly polarized light passes through said quarter-wave plate to cause said reflected beam of reverse circularly polarized light to be a second beam of polarized light with polarization perpendicular to the polarization of said first beam of polarized light from said polarizing means so that said second beam of polarized light passes through said first polarizing beam splitter to provide an output beam of polarized light from said first polarizing beam splitter,
   polarization-rotating means for rotating said output beam from said first polarizing beam splitter to provide an output beam from said polarization-rotation means,
   activating means for activating said polarization-rotating means so that said output beam from said polarization-rotating means is not rotated,
   a second polarizing beam splitter for receiving said output beam from said polarization-rotating means and causing said output beam from said polarization-rotating means to travel in a first direction when said output beam from said polarization-rotating means is rotated and in a second direction when said output beam from said polarization-rotating means is not rotated,
   first utilization means for utilizing light traveling in said first direction from said second polarizing beam splitter, and
   second utilization means for utilizing light traveling in said second direction from said second polarizing beam splitter.

6. The mechanism of claim 5 wherein said first utilization means is a viewer and said second utilization means is a portion of film in said camera.

7. The mechanism of claim 5 wherein said polarization-rotating means is a liquid-crystal cell comprising a pair of transparent electrodes and liquid-crystal materials.

8. The mechanism of claim 5 wherein:

said first utilization means is a viewer and said second utilization means is a portion of film in said camera, and said polarization-rotating means is a liquid-crystal cell comprising a pair of transparent electrodes and liquid-crystal materials.

9. The mechanism of claim 5 wherein said object is the fundus of a human eye.

10. A light-directing mechanism for replacing a hinged mirror in a single-lens-reflex camera, comprising:

polarizing means for polarizing incident light to provide a beam of polarized incident light, polarization-rotating means for rotating the polarization of said beam of polarized light to provide an output beam from said polarization-rotating means, activating means for activating said polarization-rotating means so that said output beam from said polarization-rotating means is not rotated, a polarizing beam splitter for receiving said output beam from said polarization-rotating means and causing said output beam from said polarization-rotating means to traveling in a first direction when said output beam from said polarization-rotating means is rotated and in a second direction when said output beam from said polarization-rotating means is not rotated, a viewer for receiving light traveling in said first direction from said polarizing beam splitter, and a portion of film in said camera for receiving light traveling in said second direction from said polarizing beam splitter.

11. The mechanism of claim 10 wherein said polarization-rotating means is a liquid-crystal cell comprising a pair of transparent electrodes and liquid-crystal materials.

* * * * *